United States Patent [19]

Kaname et al.

[11] 4,044,611
[45] Aug. 30, 1977

[54] EXPENDABLE OCEANOGRAPHY PROBE

[75] Inventors: Yuichi Kaname, Kaizuka; Masaya Nakajima, Neyagawa; Katumi Tabuchi, Kadoma, all of Japan

[73] Assignee: Matsushita Electric Industrial Co., Ltd., Osaka, Japan

[21] Appl. No.: 596,564

[22] Filed: July 15, 1975

[51] Int. Cl.² .............................................. G01W 1/00
[52] U.S. Cl. ................................................... 73/170 A
[58] Field of Search ......................... 73/170 A; 340/10

[56] References Cited

U.S. PATENT DOCUMENTS

| | | | |
|---|---|---|---|
| 3,098,993 | 7/1963 | Coop | 73/170 A |
| 3,325,779 | 6/1967 | Supernaw et al. | 340/10 |
| 3,341,808 | 9/1967 | Levin et al. | 73/170 A |
| 3,561,267 | 2/1971 | Costello | 73/170 A |
| 3,561,268 | 2/1971 | Massa | 73/170 A |

Primary Examiner—James J. Gill
Assistant Examiner—Anthony V. Ciarlante
Attorney, Agent, or Firm—Wenderoth, Lind & Ponack

[57] ABSTRACT

An expendable oceanography probe has a hollow cylindrical housing, a front end element in the form of a weight fitted into the lower end of the cylindrical housing, a sensor, such as a thermistor, mounted on the external surface of the front end element for detecting information relating to the water to be tested, an oscillating circuit the electrical signals of which are changed according to the signal from the thermistor, an electroacoustical disk transducer combined with the oscillating circuit for radiating a sound signal into the water corresponding to the detected temperature of the water, a transducer holder fitted on the upper end of the cylindrical housing and a rear end disk plate on the transducer holder. A center axle, a cylindrical side wall and an end surface of the transducer holder form a cavity for radiating the sound signal. The transducer has a center hole, and it is mounted on the external of the transducer holder on the center axle and is held thereon by the rear end disk plate.

13 Claims, 10 Drawing Figures

EXPENDABLE OCEANOGRAPHY PROBE

BACKGROUND OF THE INVENTION

This invention relates to an oceanography probe, which is a device for recording information relating to ocean water such as temperature or salinity at various depths and more particularly to an improved expendable oceanography probe.

In the past, for example, for measuring the temperature of water as a function of depth, it was a common practice to sink and raise a thermometer attached to a line and to record the temperature of the water. But, it is difficult to read an indication and record the temperature on a vessel moving at the sea. In order to overcome such a problem, an expendable bathythermograph system and oceanography probe are widely used. For example, U.S. Pat. Nos. 3,221,556 and 3,339,407 disclose an expendable ballistic bathythermograph system and an oceanography probe unit which provide a temperature-depth profile as the probe containing a thermometer and separated from the probe; unit falls through the water. Then the probe is abandoned at the bottom of the sea.

The probe unit of the above mentioned expendable bathythermograph system comprises a probe container, a probe, a thermistor and two spools of wire. One of the two spools of wire and the thermistor are provided in the probe and the thermistor is connected to the wire of this spool. The other of the two spools is mounted in the probe container on the vessle. When the probe is dropped, wire is unwound from both the spools, and the probe can fall nearly straight through the water. As the probe falls through the water, the thermistor in the probe sends out signals to the vessel which are responsive to the temperature of the water. When the wires are played out, the wires break and the probe sinks freely to; the bottom of the sea. This system provides some advantages as compared with a thermometer attached to a line, since it may be used even while the vessel moves at the sea. Further, as probe may be made at a low cost, it may be thrown away. However, the wire is awkward to use, and in addition, the wire affects the is a schematic diagram showing the operation of the system employing; probe falls through the water, and the operating depth for the probe is limited by the length of the wire.

So as to overcome these problems, for example as disclosed in U.S. Pat. No. 3,561,268, an expendable wireless bathythermograph system has been designed to take the temperature-depth profile of the water from the vessel which moves at sea. This probe includes a free-falling underwater body which has a streamlined hull characteristic that produces a stable rate of fall through the water, an oscillator connected to piezoelectric hollow cylindrical transducer for radiating sound waves through the water at the oscillator output frequency, and two sensors which alter the oscillator output frequency as a function of depth and temperature. A receiver on the surface of the water receives the radiated sound waves and prints out the temperature and depth of the water through which the probe is passing, Such a wireless device has advantages as compared with the above-mentioned wire expendable bathythermograph, since the probe is a wireless free-falling body radiating the under water sound signals which vary frequencies with the temperature and the depth.

However, it is difficult to make the dimensions and the contour of the piezoelectric ceramic cylindrical ring so as to provide the streamlined shape of the probe. Since the outside diameter of the piezoelectric ceramic ring transducer is generally in the range of 1.5 to 2 inches and the height of the ring transducer is about 0.5 to 1.25 times the outside diameter, the transducer with the desired shaped of a piezoelectric ceramic ring body often causes a lot of unwanted responses, which are easily piezoelectrically excited by the oscillator in the probe, with respect to the frequency characteristic of the ring transducer. Further, it is difficult to control the transmission pattern of sound waves from the probe into the surrounding water, since the transmission pattern of sound waves depends on the vertical height of the ceramic ring and the wave lengths of the radiated sounds.

SUMMARY OF THE INVENTION

Therefore, an object of the invention is to provide an improved expendable oceanography probe which may be thrown from a vessel moving at sea.

Another object of this invention is to provide an improved and completely free-falling oceanography probe which has a cylindrical-shaped housing the fall of which is not restricted by wires or any other mechanical connections.

A further object of this invention is to provide an improved low cost expendable oceanography probe housing a simple construction which transmits telemetered signals to a vessel with a sound wave carrier in the water.

Still a further object of this invention is to provide an improved expandable free-falling oceanography probe having a transducer holder which has an acoustical cavity for controlling the directional pattern of the sound wave into the surrounding water.

These objects are achieved by providing an expendable oceanography probe according to the present invention, which comprises a hollow cylindrical housing, a front end element in the form of a weight fitted into the lower end of said cylindrical housing, a sensor mounted on the external surface of said front end element for detecting information relating to the water to be tested, an oscillating circuit the electrical signals of which are changed according to the signal from said sensor, an electroacoustical disk transducer combined with said oscillating circuit for radiating a sound signal into the water corresponding to the detected information, a transducer holder fitted on the upper end of said cylindrical housing and having a center axle and a cylindrical side wall thereon, and a rear end disk plate on the transducer holder, said transducer having a center hole therein and being mounted on said transducer holder on said center axle and fixed thereto by said rear end disk plate, and said side wall of said transducer holder forming an external cavity on the end of said transducer holder having a dimension corresponding to a desired radiation characteristic of sound signal from said transducer into water.

BRIEF DESCRIPTION OF THE DRAWINGS

These and other objects and the features of the invention will be apparent from a preferred embodiment of the invention which may be understood from a study of the following description when taken in connection with the accompanying drawings in which.

DETAILED DESCRIPTION OF THE PREFERRED EMBODIMENT

Figure 1:
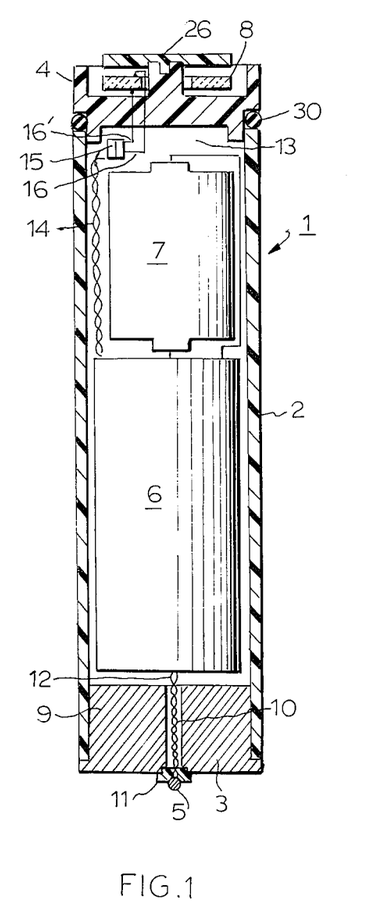
FIG. 1 is a cross-sectional view of an expendable oceanography probe according to the invention.

Referring now to FIG. 1, an expendable free-falling bathythermograph probe 1 according to the invention has a cylindrical shape and it is surrounded with a hollow cylindrical housing 2 such as a pipe of well-known plastic material. A front end element 3 is fitted into the lower end portion of the housing 2, and a transducer holder 4 is in watertight engagement fitted into the upper end portion of the housing 2. The major inside space of the probe is occupied by two blocks 6 and 7. The block 6 is a detector for detecting the information of the water to be measured and an oscillator for driving an electroacoustical disc transducer 8 according to the signal from the detector. The block 7 is a battery for powering the detector and the oscillator. The electroacoustic disc transducer 8 is held on the external surface of the transducer holder 4 and is exposed to the water in the sea.

The front end element 3 is a weight for the probe for providing free-falling at a stable rate of speed and for providing sinking with stabilized force through the water, and it has a flat end surface which is a cutwater of the probe and a an inner end 9. The bottom end 9 of said end element 3 is secured to the inside of the lower end of the cylindrical housing 2 so as to prevent water leakage therebetween. The front end element 3 has an axial aperture 10, and a plug 11 of thermal insulation material is mounted in the aperture 10 on the external surface of said end element 3, as shown in FIG. 1. In the following, the expendable oceanography probe of the invention will be described for application as a bathythermograph for measuring temperature of water. However, it should be noted that the oceanograph probe of the invention is not limited to a bathythermograph, and various applications thereof such as for measuring salinity of the sea are included in the scope of the invention. A temperature sensor 5 such as a thermistor is attached to the plug 11, and it is connected to the detector 6 by conductive wires 12 which are passed through the axial aperture 10. The axial aperture 10 is hermetically sealed by filling it with a resin, such as an epoxy adhesive, so as to prevent water leakage into the inside of the housing.

The detector and the oscillator are assembled on a printed circuit board which is fixed to the inside wall of the cylindrical housing or to the bottom of the top end element. The battery is inserted from an opening 13 in the rear end of the cylindrical housing, and connected to the detector and the oscillator by wire. The detector and the oscillator may have any form suitable for this use.

As the ambient temperature changes on the outside of the probe, the thermistor senses the change and thereby the detector provides electrical control signals, such as electrical pulse signals modulated by a pulse duration modulation method. By means of the pulse control signal, the oscillator generates, for example, electrical pulse signals which have widths of about two milliseconds to ten milliseconds and time spacing varying approximately from 40 milliseconds to 110 milliseconds for temperatures from $-5$ to $+30$ degrees centigrade. The electric signals from the oscillator 6 are applied to the piezoelectric ceramic transducer 8 via a conductive wire 14 and a connector 15 through the opening 13 of the upper end of the cylindrical housing 2. The inside wall of the upper end of the housing is threaded for inserting the transducer holder 4. The transducer holder has an O-ring 30 for sealing out the sea water and is fitted into the opening 13 of the cylindrical housing 2. The transducer holder may be used as a lid for the opening 13 of the upper end of the housing 2. After these components are arranged in the housing, a suitable potting compound, for example an epoxy, is poured into the hollow cylindrical housing.

In the following, there is described as one practical embodiment detector and oscillator for providing an ultrasonic output pulse signal of ultrasonic output which is modulated according to the temperature information from the temperature sensor 5.

Figure 2:
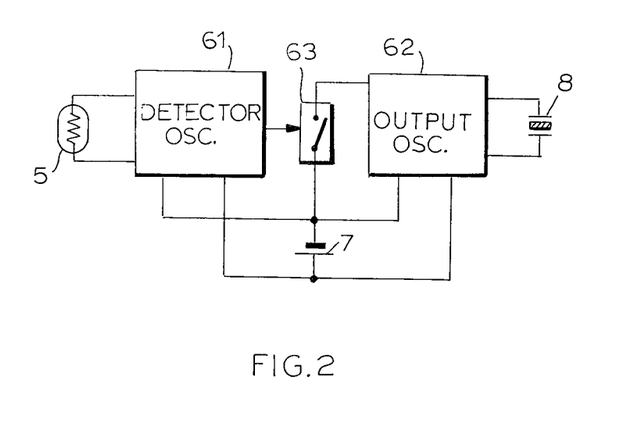
FIG. 2 is a block diagram of a bathythermograph as an embodiment of the invention.

Referring to FIG. 2, an output oscillator 62 uses a piezoelectric ceramic transducer 8 as a resonant element thereof, A conventional oscillator circuit using a piezoelectric resonator can be used as the oscillator 62. Another oscillator 61 acts as the detector described above, and it generates relaxation oscillation of a frequency much lower than the oscillating frequency of the output oscillator 62. A conventional multivibrator can be used as the oscillator 61. The oscillating frequency of the multivibrator is determined by a time constant of a charge and discharge path of the circuit, and as described hereinafter the thermistor 5 is used as one of the components of the charge and discharge path. A switching element 63 is connected between one terminal of the oscillator 61 and the negative terminal of the battery 7, and it is driven by the output from the oscillator 61. Oscillation of the oscillator 62 is controlled so as to be stopped or started according to the on, off operation of the switching element 63.

Figure 3:
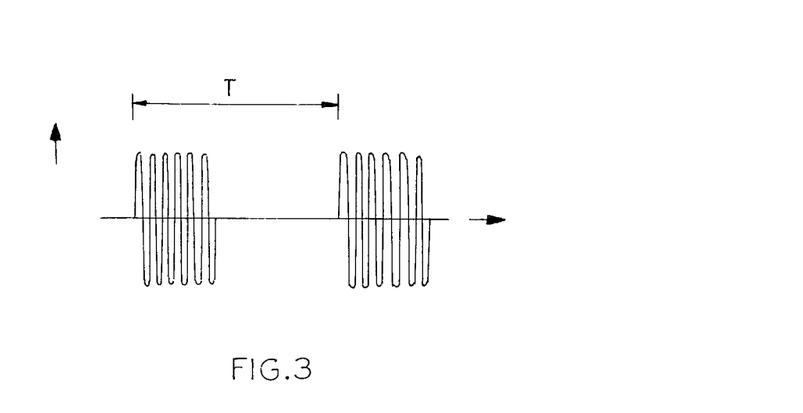
FIG. 3 is a diagram of a sound pulse signal provided by the bathythermograph of FIG. 2.

When the probe 1 is dropped into water, the thermistor 5 detects the temperature of the water, and the oscillator 61 generates oscillation having a period according to that temperature. At the same time, the switching element 63 is driven and controls the operation of the oscillator 62. Then, the ultrasonic pulse signal as shown in FIG. 3 is projected into the water from the transducer 8. The period T of the generated signal is obviously determined according to the temperature.

Figure 4:
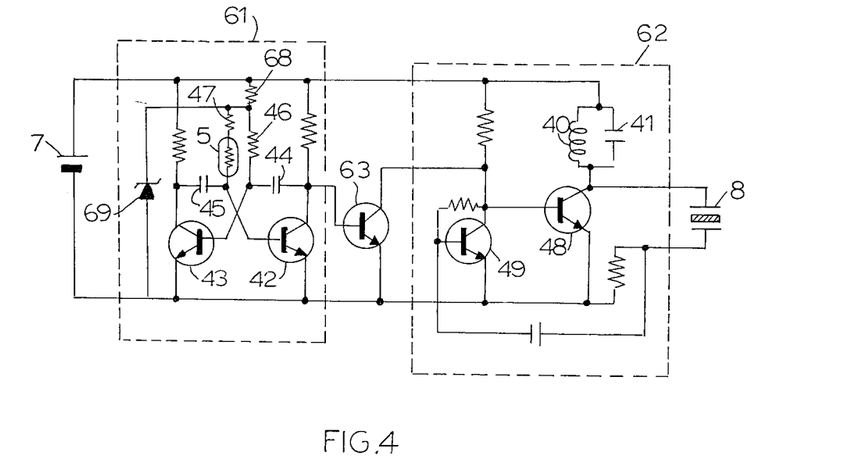
FIG. 4 is a circuit configuration of the block diagram of FIG. 2.

FIG. 4 is a circuit diagram of an example of the circuit described above. The oscillator 62 is comprised of transistors 48 and 49 and a tank circuit composed of a coil 40 and a capacitor 41, and it forms a voltage feedback type oscillator with the piezoelectric ceramic transducer 8. As the Q-value of the transducer 8 is large enough and the resonance circuit of the coil 40 and the capacitor 41 is arranged so as to resonate at the fundamental vibration frequency of the transducer 8, the oscillator frequency of the circuit 62 becomes nearly equal to that fundamental vibration frequency.

In FIG. 4, as the switching element 63, a transistor is used the collector and emitter of which are connected to the collector and the emitter of the transistor 49, respectively. The base of the transistor 63 is connected to the collector of a transistor 42 which forms a multivibrator together with a transistor 43 in the circuit 61. As understood from FIG. 4, when the base of the transistor 63 is made positive and the transistor is placed in the on condition, the collector-emitter path of the transistor 49 of the oscillator 62 is short circuited and the oscillation is stopped.

The oscillating frequency of the multivibrator comprising the transistors 42 and 43 is determined according to the constants of a discharge circuit, that is capacitance of capacitors 44 and 45, resistance of resistors 46 and 47 and resistance of the thermistor 5 connected to the resistor 47. A constant voltage circuit composed of a resistor 68 and a constant voltage diode 69 provides a constant voltage to the discharge circuit. From the well known operation of the multivibrator and the circuit configuration of FIG. 4, it will be understood that the period when the transistor 42 becomes cut off and its collector voltage becomes nearly equal to the positive voltage of the battery is determined by the resistance value of the thermistor, i.e. the temperature of the water through which the probe is sinking. Then, the switching transistor 63 is operated with this period, the ultrasonic pulse signal as shown in FIG. 3 is radiated into the water from the transducer 8.

Figure 5:
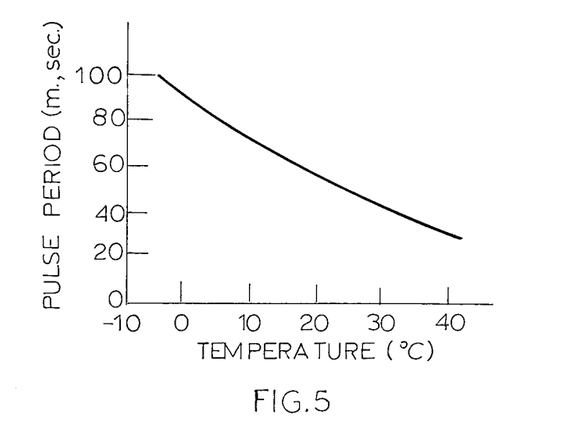
FIG. 5 is a graph is a relation between temperature and the period of the pulse signal of the bathythermograph of FIG. 4.

FIG. 5 shows an example of the relation between the temperature of the water and the period of the pulse signal provided by the detector and the oscillator described above. It is of course possible to use any other suitable system for detecting the temperature of the water and providing the ultrasonic output signal controlled according to the detected temperature, besides the circuits described above.

Figure 6:
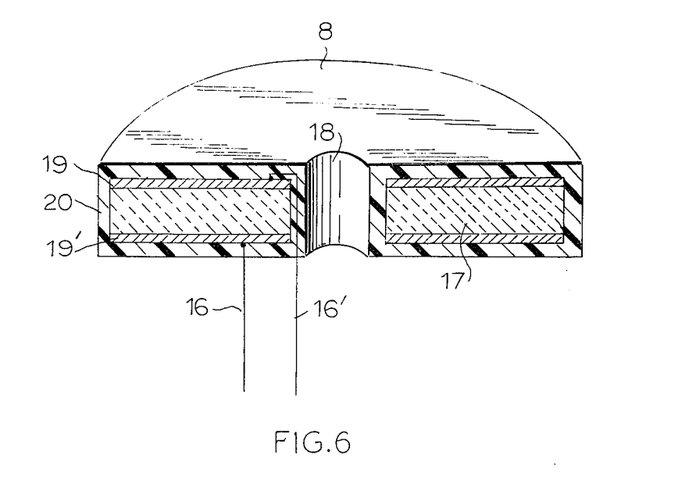
FIG. 6 is a perspective view, partly in section, of a piezoelectric ceramic disc transducer with a concentric hole used for the oceanography probe shown in FIG. 1.

The electroacoustical disk transducer 8 used in the probe comprises, as shown in FIG. 6, a piezoelectric ceramic disk body element 17 with a concentric hole 18, electrodes 19 and 19' which are applied to the opposite major surfaces of said body element, conductive wires 16 and 16' which are respectively attached to the electrodes, and coating 20 which wholly covers the body element and the electrodes. One of the conductive wires passes through the hole 18 and is associated with the other wire. The wires 16 and 16' pass through the transducer holder 4 and are connected to the output terminals of the oscillator 6 through the connector 15 and wires 14 and 14'. The wires 16 and 16' are secured to the transducer holder so as to prevent water leakage there between. The transducer 8 is preferably driven at the resonant frequency of a fundamental mode of radial vibration of the piezoelectric ceramic disk with the concentric hole.

For the dimension of the piezoelectric ceramic disk body element 17, the disk shape factor, which is the ratio of the outside diameter and the thickness, should be greater than five and preferably from eight to thirteen, for achieving pure mode of radial vibration. It is well known that a resonator having a disk shape factor smaller than five vibrates in a complex coupled mode of radial vibration. Further, the ring shape factor, which is the ratio of the inside diameter and the outside diameter, should be smaller than one third and preferably from about one tenth to about three tenths, since the electroacoustical properties of a ring resonator having a larger ring shape factor are generally inferior to the properties of a disk resonator having a small ring shape factor.

Figure 7:
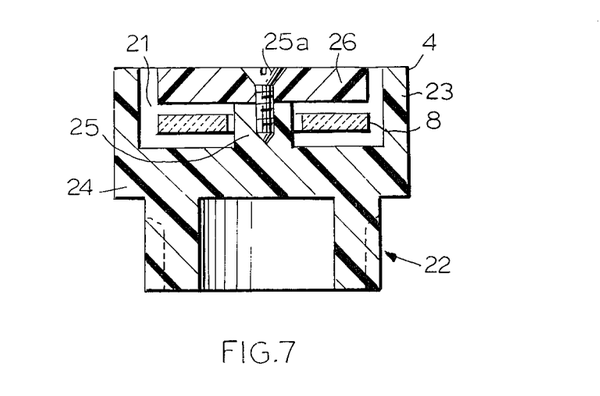
FIG. 7 shows a cross-sectional view of the transducer holder for holding the transducer of FIG. 2.

The transducer 8 combined with the transducer holder 4 is mounted on the external surface at the upper end of the probe 1, and it is directly exposed to the surrounding water. As shown in FIG. 7, the transducer holder 4 has an annular cavity 21 for suitably receiving the transducer 8 therein and a threaded inside wall 22 for fitting into the opening 13 of the upper end of the cylindrical housing 2.

The annular cavity 21 is formed by a side wall 23, a bottom 24 which is the exterior end surface of the holder, and an axle 25 at the center of the bottom plate. A rear end plate 26 is attached to the axle 25 by a screw 25a. The dimensions of the cavity 21 must be larger than the dimensions of the ceramic disk transducer 8. The axle 25 is inserted into the hole 18 of transducer 8.

The dimension and shape of the side wall 23 and the bottom 24 are arranged so as to continue from an extension of the shape of the cylindrical housing 2. The height of the axle 25 is larger than the thickness of the disk transducer 8. A washer of rubberlike material may be inserted between the disk transducer 8 and the bottom 24 and or between the disk transducer 8 and the rear end plate 26, as long as the disk transducer can vibrate freely. The height and the thickness of the side wall are determined according to a required radiation pattern of the sound waves from the probe 1. For example, when an omnidirectional radiation characteristic of sound waves is required, the height of the side wall 23 should be larger than half of the height of the axle 25 and smaller than the sum of the height of the axle and the thickness of the rear end plate.

Figure 8:
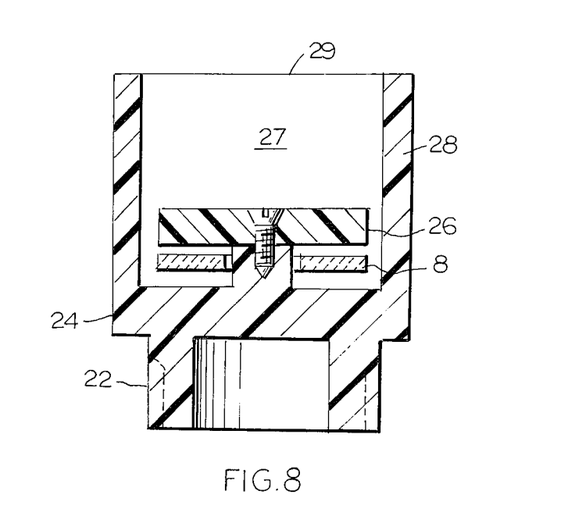
FIG. 8 is a cross-sectional view of a transducer holder with an acoustic cavity according to the invention.

FIG. 8 shows another type of transducer holder having an acoustical cavity 27 which is surrounded by the side wall 28 and the rear end plate 26. In this case, a sound wave from the piezoelectric ceramic disk transducer 8, which is radiated from the opening 29 of the cavity 27 has a beam characteristic dependent on the height and thickness of the side wall 28.

The weight and the dimension of the probe are important for causing the probe to fall through the water at a stable rate of speed and in a stable posture. The dimensions of the transducer and the cavity are arranged according to the frequency of the carrier sound signal. For example, in case a 50 kHz carrier signal, the outside diameter, the inside diameter and the thickness of the piezoelectric ceramic disk transducer 8 are selected to be about 34 mm, from 12 mm to 7 mm, and about 5 mm, respectively. Then, the outside diameter and the inside diameter of the cylindrical housing 2 are selected to be 43 mm and 35 mm, respectively. Also, the inside diameter of the side wall 23 is 35 mm to 39 mm, the height of the side wall 23 is 2 mm to 10 mm, and the diameter of the axle is 7 mm to 11 mm. When the total length and the total weight of the probes is 185 mm and 500 grams to 750 grams, respectively, the apparent density of the probe is in the range of about 1.9 grams/cm$^3$ to 2.8 grams/cm$^3$. In addition, the position of the center of the gravity in the probe is very important for vertical free-falling of the probe which crosses the tidal current flowing through the sea. Usually, the center of the gravity should be positioned at a position from the lower end to a point one-third the length and along the central longitudinal axis of the probe.

The initial drop speed of the expendable bathythermograph probe is preferably set so that the probe reaches quickly a fixed falling velocity at which the fluid resistance of the water equals the accelerative force of gravity. Thereafter, the drop rate remains constant. The drop speed of the probe varies with the density and the dimensions of the probe and the fluid resistance to the probe. In the case of the above described dimension and weight of the probe for a 50 kHz signal, the free-falling speed of the probe is in the range of 1.5 m/sec to 3m/sec. As the speed of the probe falling through the water at a high drop speed is caused to fluctuate due to cavitation, and at a low drop speed the probe is affected by tidal current, the probe should be designed for a moderate drop speed.

Figure 9:
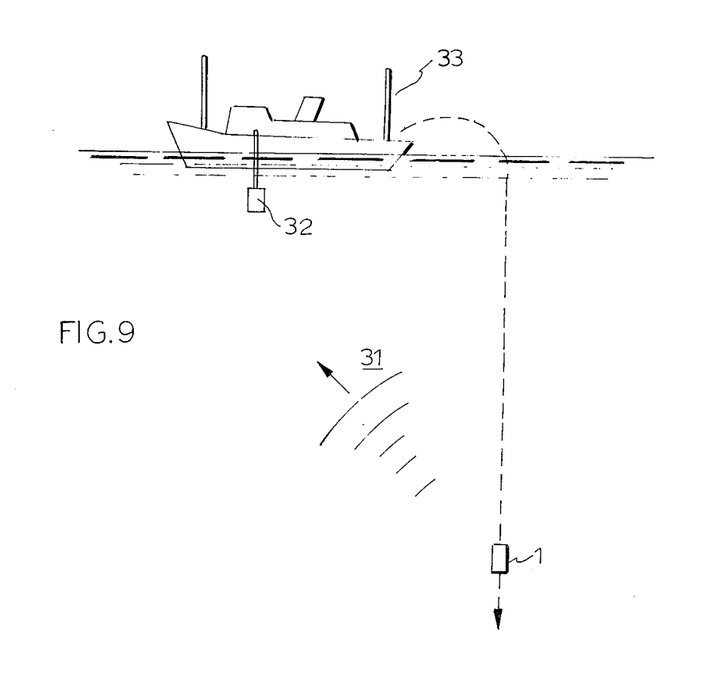
FIG. 9 is a schematic diagram showing the operation of the system employing; the expendable oceanography probe of the invention.
Figure 10:
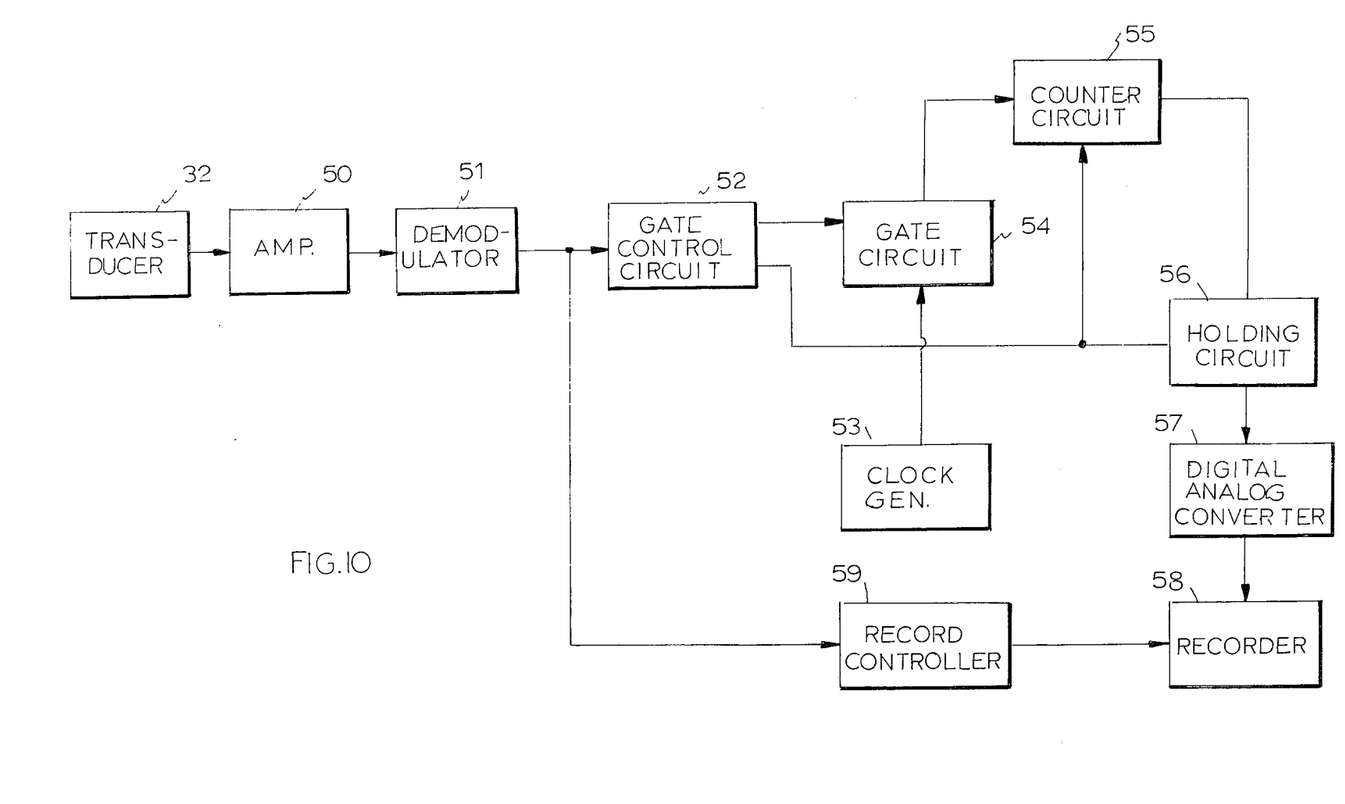
FIG. 10 is a block diagram of the receiving system for the oceanography probe of the invention.

FIG. 9 shows schematically how the system using the expendable bathythermograph operates, and FIG. 10 is a block diagram of the receiving system. The probe 1 is thrown into the sea from a moving ship 30, and the probe 1 falls vertically through the water. The sound pulse signal 31 is radiated from the transducer of the probe 1 a changing time spacing of the pulse train as a function of the ocean temperature, as described hereinbefore, and it is received by a receiving transducer 32 installed on the ship 33 under the sea.

Referring to FIG. 10, the sound signal received by the transducer 32 is amplified by a selective amplifier 50 turned to the frequency of the sound signal, demodulated by a demodulator 51, and then it is converted into a pulse signal which has a similar wave form to that of the output signal of the circuit 61 in FIG. 2 or 4. The time spacing of the pulse train is counted by a clock signal generator 53 having a suitable reference frequency, a gate circuit 54 and a counter circuit 55. A gate control circuit 52 receives the pulse signal from the demodulator 51 and provides a start signal for opening the gate 54, and the counter 55 begins to count the output of the clock signal generator 53. When the next pulse signal arrives, the gate control circuit 52 closes the gate 54 and triggers a holding circuit 56 for holding the content of the counter 55. At the same time, it provides a stop signal for resetting the counter 55 for the next counting operation. Such an operation for counting the time spacing of the pulse can be achieved by the well known any suitable prior art. The output of the holding circuit 56 is applied to a digital-analog converter 57, and the analog output is applied to a recorder 58, such as a conventional pen recorder. For the expendable bathythermograph of the invention, the depth of the probe is determined by measuring the time after the probe is thrown into the sea because the probe sinks at a constant speed. For this measurement, the recorder 58 is connected to a record controller 59 in FIG. 9. That is, usually in the recorder 58 the recording sheet is stopped, and when the first pulse from the demodulator 51 is applied to the recorder controller 59, it provides a start signal to the recorder 58 for releasing the driving mechanism of the recording sheet. As the recording sheet is moved at a constant speed, from the known relation between the depth of the probe and the falling time, a uniform scale of the depth can be provided on the recording sheet.

Although it has been described hereinbefore as being for measuring temperature, the expendable oceanography probe of the invention can be used as an expendable instrument probe for measuring salinity. In this case the temperature sensor 5 is changed to a salinity sensor, and it will be understood that the other components such as the oscillator, the transducer and the transducer holder with the cavity, as described hereinbefore, can be employed nearly as they are.

Still other modifications will readily occur to those who are skilled in the art. Therefore the claims are to be construed broadly enough to cover all equivalents falling within the true scope and spirit of the invention.

What is claimed is:

1. An expendable oceanography probe of the free-falling type comprising: a hollow cylindrical housing; a front end weight element hermetically fitted into the lower end of said cylindrical housing; a sensor mounted on the external surface of said front end element for detecting information relating to water to be tested, said external surface of said front end element being a flat surface: an oscillating circuit electrically coupled to said sensor and the oscillating frequency of which is changed according to the signal from said sensor; an electroacoustical disk transducer to operate in radial vibration mode and electrically coupled with said oscillating circuit for radiating a sound signal corresponding to the detected information into water around the probe; a transducer holder hermetically mounted on the upper end of said cylindrical housing and having an end surface facing outwardly of the probe, a center axle on the end surface and a cylindrical wall around said end surface; and a rear end disk plate, said transducer having a center hole and being mounted within said cylindrical wall and over said center axle with said center axle extending through said hole and said rear end disk plate attached to said axle for holding said transducer on said transducer holder, said probe having an apparent density in the range of about 1.9 grams/cm$^3$ to 2.8 grams/cm$^3$, the center of gravity of said probe being positioned at a point between the lower end and one third the length of the probe from the lower end and along the central longitudinal axis of said probe.

2. An expendable oceanography probe as claimed in claim 1 wherein said transducer holder has an annular cavity therein defined by said side wall, said center axle and said end surface thereof, the dimensions of said cavity being according to the desired radiation characteristic of the sound signal radiated from said transducer.

3. An expendable oceanography probe as claimed in claim 2 wherein the height of said side wall is larger than half the height of said axle and smaller than the sum of the height of said axle and the thickness of said rear end plate, whereby said cavity has a form suitable for an omnidirectional radiation characteristic of the sound waves radiated from said transducer.

4. An expendable oceanography probe as claimed in claim 2 wherein the height of said side wall is larger than the sum of the height of said axle and the thickness of said rear end plate, whereby said cavity has a form suitable for a beam radiation characteristic of the sound waves radiated from said transducer.

5. An expendable oceanography probe as claimed in claim 1 wherein said electroacoustical disk transducer is a piezoelectric ceramic disk body having electrodes on the opposite major surfaces thereof.

6. An expendable oceanography probe as claimed in claim 5 wherein said oscillating circuit comprises means for driving said piezoelectric ceramic transducer at a resonant frequency of a fundamental mode of radial vibration of said piezoelectric ceramic disk with said concentric hole.

7. An expendable oceanography probe as claimed in claim 6 wherein the disk shape factor of said ceramic disk, which is the ratio of the outside diameter to the thickness of said ceramic disk, is greater than five, and the ring shape factor of said ceramic disk which is the ratio of the inside diameter and the outside diameter of said ceramic disc is smaller than one-third.

8. An expendable oceanography probe as claimed in claim 7 wherein said disk shape factor is from eight to thirteen, and said ring shape factor is from one-tenth to three-tenths.

9. An expendable oceanography probe as claimed in claim 5 wherein said oscillator circuit comprises means for driving said ceramic transducer to radiate the sound signal with a 50kHz carrier frequency, and the outside diameter, the inside diameter and the thickness of said ceramic disk are about 34 mm, from 12mm to 7mm, and about 5mm, respectively.

10. An expendable oceanography probe as claimed in claim 9, wherein the inside diameter and the height of said side wall is 35 to 39 mm and 2 to 10mm, respectively, and the diameter of said axle is 7 to 11mm.

11. An expendable oceanography probe as claimed in claim 10, wherein said cylindrical housing has an outside diameter of about 43mm, a total length of about 185mm and a total weight of 500 to 750 grams, respectively.

12. An expendable oceanography probe as claimed in claim 1, wherein said sensor is a thermistor for detecting the temperature of water.

13. An expendable oceanography probe as claimed in claim 13 wherein said sensor is a salinity sensor for detecting salinity of water.

* * * * *